Apr. 10, 1923 — B. LIMOSETH — 1,451,620
DRAFT ATTACHMENT
Filed Sept. 22, 1921
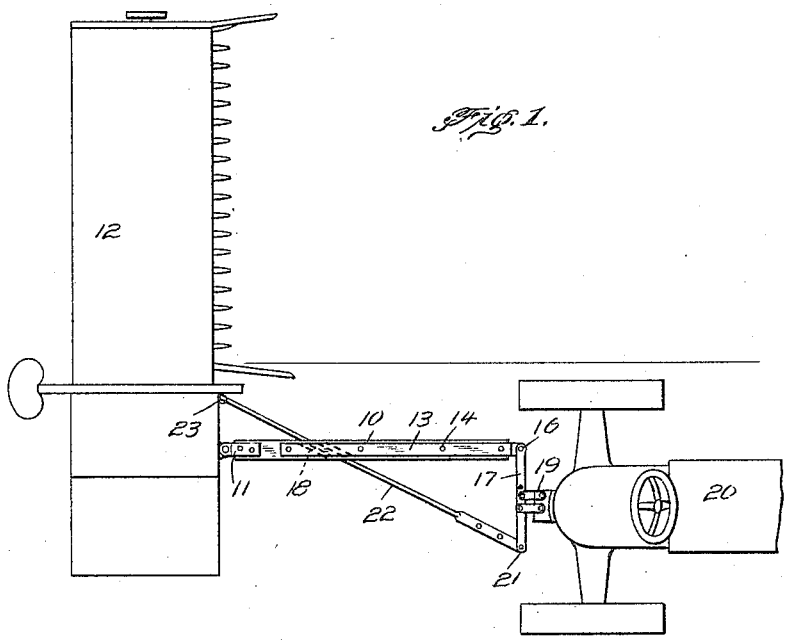
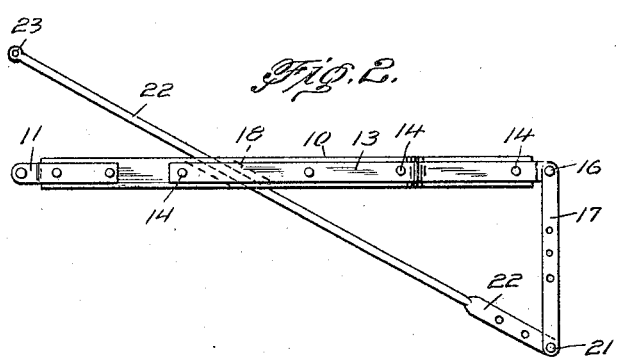
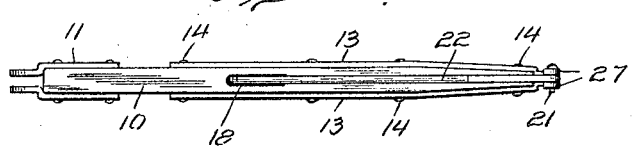
B. Limoseth, INVENTOR.
BY Geo. P. Kimmel, ATTORNEY.

Patented Apr. 10, 1923.

1,451,620

UNITED STATES PATENT OFFICE.

BERNT LIMOSETH, OF WESTBY, WISCONSIN.

DRAFT ATTACHMENT.

Application filed September 22, 1921. Serial No. 502,462.

*To all whom it may concern:*

Be it known that I, BERNT LIMOSETH, a citizen of the United States, residing at Westby, in the county of Vernon and State of Wisconsin, have invented certain new and useful Improvements in Draft Attachments, of which the following is a specification.

This invention relates to draft equalizers of the class employed more particularly in coupling harvesters, mowers, gang or other plows, and the like, to tractors, and has for one of its objects to simplify and improve the construction and increase the efficiency of devices of this character.

Another object of the invention is to provide a simply constructed device which may be applied without material structural change to various forms of agricultural implements which are to be drawn over the ground and whereby side draft is practically eliminated.

With these and other objects in view, the invention consists in certain novel features of construction as hereinafter shown and described and then specifically pointed out in the claim, and in the drawings illustrative of the preferred embodiment of the invention;—

Figure 1 is a plan view of the improved device applied to a conventional tractor and harvester.

Fig. 2 is an enlarged detail view of the improved device.

Fig. 3 is an edge view of the parts shown in Fig. 2.

The improved device includes a main draft tongue 10 having means such as a clip device 11 at one end to enable the beam to be coupled to the machine to be moved, for instance, a grain harvester represented diagrammatically at 12, at the point where the ordinary draft tongue is usually attached.

The beam 10 is reinforced by straps 13 attached as by rivets 14 to the upper and lower faces of the same, and extended at one end to form clips to pivotally support, at 16, a draw bar device 17.

Formed through the body of the beam 10 intermediate its ends is a relatively long slot 18 directed obliquely to the longitudinal plane of the beam, as shown.

The draw bar 17 is adapted to be coupled, as by a clevis 19, to a tractor, indicated conventionally at 20.

Pivoted at 21 to the free end of the draw bar 17, is a draft equalizing rod 22, the latter passing through the slot 18 in the beam 10 and coupled at 23 to the machine to be drawn, in the illustration the harvester 12, the coupling 23 being located between the tongue hitch 11 and the sickle element.

The coupling bar 23 is thus spaced for some distance from the coupling bar 11 as shown in Fig. 1.

By this arrangement the side draft is practically eliminated, and the tractor enabled to move on the "stubble" or "land" side, and does not travel at any time on the grain or furrow side, as will be obvious.

By this arrangement also the equalizing rod 22 is supported intermediate the ends by the material of the beam above and below the slot 18 and is effectually prevented from sagging or from being accidentally displaced upwardly.

The reinforcing straps 13 prevent any weakness being produced by the presence of the slot 18.

The preferred embodiment of the invention is disclosed in the drawings and set forth in the specification, but it will be understood that modifications within the scope of the claim may be made in the construction without departing from the principle of the invention or sacrificing any of its advantages.

Having thus described the invention, what is claimed is:—

A draft equalizer comprising a main draft beam having a transverse intermediate slot and adapted to be attached at one end to the machine to be moved, a draw bar coupled at one end to the forward end of the beam and adapted to be connected intermediate the ends to the draft power, and a continuous pull member coupled at one end to the free end of the draw bar and passing through the intermediate slot of the beam and adapted to be attached at the other end to the machine to be moved and in spaced relation to the draft beam.

In testimony whereof, I affix my signature hereto.

BERNT LIMOSETH.